United States Patent
Jun et al.

(10) Patent No.: US 8,324,847 B2
(45) Date of Patent: Dec. 4, 2012

(54) MOTOR FOR WASHER, METHOD FOR CONTROLLING THE MOTOR, AND METHOD FOR CONTROLLING THE WASHER

(75) Inventors: Cha-Seung Jun, Seoul (KR); Byoung-Wook Min, Seoul (KR); Dong-Cheol Lee, Seoul (KR); Jae-Chul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 12/744,244

(22) PCT Filed: Sep. 24, 2008

(86) PCT No.: PCT/KR2008/005677
§ 371 (c)(1),
(2), (4) Date: May 21, 2010

(87) PCT Pub. No.: WO2009/066864
PCT Pub. Date: May 28, 2009

(65) Prior Publication Data
US 2010/0283414 A1    Nov. 11, 2010

(30) Foreign Application Priority Data
Nov. 23, 2007 (KR) .................. 10-2007-0119964

(51) Int. Cl.
*H02P 21/00* (2006.01)
(52) U.S. Cl. ................................. 318/400.02
(58) Field of Classification Search .............. 318/400.02
See application file for complete search history.

(56) References Cited

U.S. PATENT DOCUMENTS

| | | | |
|---|---|---|---|
| 2002/0195979 A1* | 12/2002 | Ishii | 318/254 |
| 2003/0020431 A1 | 1/2003 | Kiuchi et al. | |
| 2005/0160771 A1 | 7/2005 | Hosoito et al. | |
| 2005/0248306 A1* | 11/2005 | Chen et al. | 318/712 |
| 2006/0021392 A1 | 2/2006 | Hosoito et al. | |
| 2009/0295316 A1* | 12/2009 | Patel et al. | 318/400.02 |

FOREIGN PATENT DOCUMENTS

| | | |
|---|---|---|
| JP | 2001145796 A | 5/2001 |
| JP | 2004267334 A | 9/2004 |

OTHER PUBLICATIONS

Internatinal Serch Report dated Apr. 13, 2009 for Application No. PCT/KR2008/005677, 3 pages.

* cited by examiner

*Primary Examiner* — Derek Rosenau
(74) *Attorney, Agent, or Firm* — Fish & Richardson P.C.

(57) ABSTRACT

A motor, and a method and apparatus for controlling the motor for a washer are provided. The motor includes a stator on which a plurality of coils are wound and disposed in a circular shape, a rotor having a plurality of permanent magnets spaced apart from the coils by a predetermined distance, and a motor controller performing a vector control method for controlling a current vector applied on a d-q axis rotating coordinate system in a start mode of the rotor to make a current speed of the rotor follow a reference speed of the rotor by comparing the current speed with the reference speed. The motor controller includes a speed/position detector for detecting the current speed and a current position of the rotor using an on/off signal of a hall sensor installed on the stator.

14 Claims, 6 Drawing Sheets

MOTOR FOR WASHER, METHOD FOR CONTROLLING THE MOTOR, AND METHOD FOR CONTROLLING THE WASHER

BACKGROUND

The present disclosure relates to a motor for a washer, a method for controlling the motor, and a method for controlling the washer.

A motor is a device generating rotational motion of a rotor using external power.

A washer is for washing laundry. There are a variety of different types of washers, among which a drum type washer has a drum that is horizontally disposed and in which the laundry is loaded. A washer motor is mounted behind the drum to rotate the drum. A blushless direct current (BLDC) motor is mainly used as the washer motor that can rotate at a high speed and reduce noise.

The washer motor is designed to perform a flux weakening operation mode when a speed of the washer motor increases above a predetermined level so that the motor can rotate at a high speed even with relative small capacity and size.

In the flux weakening operation mode, an amount of the current applicable to the motor is reduced by counter electromotive force after the motor reaches a rated speed, so as to solve a limitation where the speed of the motor cannot increase even when the current is applied. That is, the flux weakening operation mode is a mode for forcedly weakening the magnetic flux. That is, the flux weakening operation mode is a mode for forcedly weakening the magnetic flux. In more detail, the flux weakening mode is a mode where, the flux is weakened by increasing an amount of the current applied in the d-axis that is in parallel with the magnetic flux direction of the permanent magnets in the d-q axis rotating coordinate system used in the vector control method after the motor reaches the rated speed. By this, the motor can be driven with a speed higher than the rated speed although the operating efficiency of the motor is deteriorated.

Meanwhile, the washer performs a variety of cycles, for example, such as a washing cycle for washing laundry loaded in a drum by rotating the drum, a rinsing cycle for rinsing the laundry that is washed, and a spinning cycle (dewatering cycle) for removing water from the laundry by rotating the drum at a high speed. The washer motor performs the flux weakening operation mode only considering a speed of the drum regardless of the above-described cycles.

However, the flux weakening operation mode may not be proper for some of the cycles.

When the flux weakening operation mode is performed and the drum reaches a predetermined speed or more, noise and vibration of the washer increase and sometimes the drum may break away.

In addition, the flux weakening operation mode may be forcedly performed due to a variety or causes (e.g., when the speed of the drum is inaccurately detected due to malfunction of a sensor). In this case, the operating efficiency of the motor is deteriorated and the washer malfunctions.

SUMMARY

Embodiments provide a washer motor having a motor that can stably perform a flux weakening operation mode, a method for controlling the motor, and a method for controlling the washer.

Embodiments also provide a washer motor that can improve stability of a system by enabling a flux weakening operation mode to be possible only at a proper time and forcedly performing a normal operation mode that is an opposite concept to the flux weakening operation, a method for controlling the motor, and a method for controlling the washer.

Embodiments also provide a washer motor that can reduce noise and vibration of a washer and improve energy consumption efficiency, a method for controlling the motor, and a method for controlling the washer.

In one embodiment, a washer motor includes: a stator on which a plurality of coils are wound and disposed in a circular shape; a rotor having a plurality of permanent magnets spaced apart from he coils by a predetermined distance; and a speed controller for generating at least one of a d-axis reference current $Id^*$ and a q-axis reference current $Iq^*$ by controlling currents Id and Iq on a d-q axis rotation coordinate system defined by a d-axis that is in parallel with a flux direction of the permanent magnets and a q-axis that is perpendicular to the flux direction by comparing a current speed of the rotor with a reference speed so that the current speed follows the reference speed, wherein, when the current speed is less than the reference speed in a spinning cycle, the speed controller generates the d-axis reference current $Id^*$ and, when the current speed is less than the reference speed in a washing cycle, the speed controller makes the d-axis reference current $Id^*$ zero (0); a current controller for generating a d-axis reference voltage $Vd^*$ and a q-axis reference voltage $Vq^*$ based on the d-axis reference current $Id^*$ and q-axis reference current $Iq^*$ output from the speed controller; and an inverter for generating a PWM signal based on the reference voltages $Vd^*$ and $Vq^*$ output from the current controller and applying the generated PWM signal to the coils.

The d-axis reference current $Id^*$ generated in the spinning cycle may be zero (0) until the rotor reaches a predetermined speed. The predetermined speed may be 600 rpm. The d-axis reference current $Id^*$ generated in the washing cycle may be zero (0) regardless of a difference between an actual speed and the reference speed. The d-axis and q-axis reference currents $Id^*$ and $Iq^*$ may be controlled even in a start mode of the motor by the speed controller.

The washer motor may further include two hall sensors installed on the stator to detect a speed/position of the rotor. The position of the rotor may be continuously assumed by an on/off signal of the two hall sensors. The position of the rotor may be assumed with a sine curve by the speed/position detector.

In another embodiment, a method for controlling a washer motor including a stator fixed on a tub and a rotor rotating relative to the stator and having permanent magnets includes: measuring an actual speed of the rotor; generating d-axis and q-axis reference currents $Id^*$ and $Iq^*$ so that the actual speed of the rotor follows a reference speed by controlling currents Id and Iq on a d-q axis coordinate system defined by a d-axis that is in parallel with a flux direction of the permanent magnets and a q-axis that is perpendicular to the flux direction; and generating a PWM signal based on the reference currents to rotate the motor, wherein, when the washer motor is in a washing cycle, the d-axis reference current $Id^*$ is zero (0) to prevent generation of an inverse torque.

At least one hall sensor may be installed on the stator and the position of the rotor is continuously assumed in accordance with an on/off signal of the hall sensor. In addition, the d-axis and q-axis reference currents $Id^*$ and $Iq^*$ may be controlled even in a start mode of the motor by the speed controller.

In an operation of generating the reference currents, the d-axis reference current $Id^*$ may be generated when the washer motor is in a spinning cycle so that a flux weakening operation mode can be performed.

In still another embodiment, a method for controlling a washer by driving a motor including a stator fixed on a tub and a rotor rotating relative to the stator and having permanent magnets includes: stopping a flux weakening operation mode in a washing cycle so that the motor can stably driven even when three is an abrupt load change; and performing the flux weakening operation mode in a spinning cycle so that the motor rotates at a high speed.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
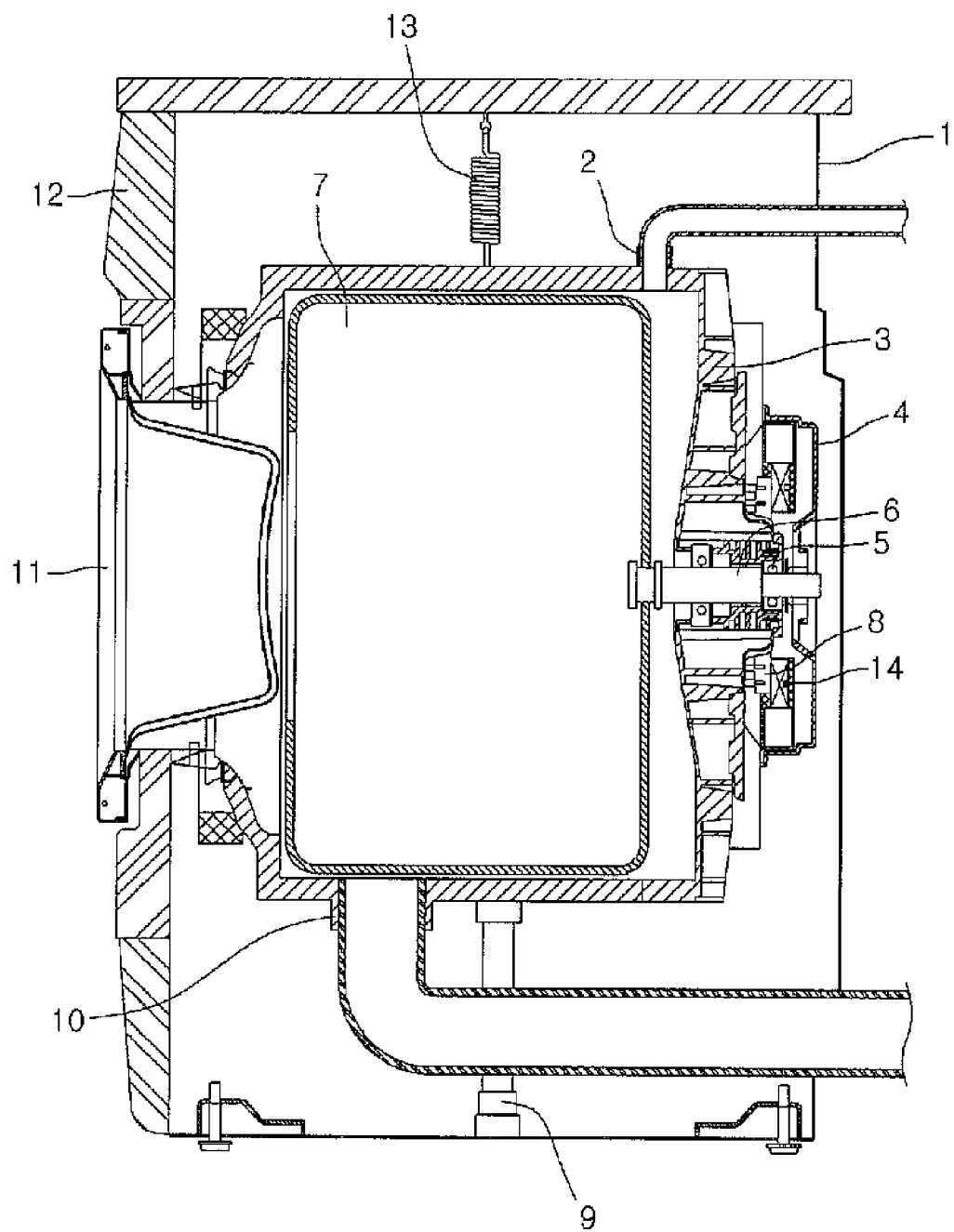
FIG. 1 is a cross-sectional view of a washer according to an embodiment.

FIG. 1 is a cross-sectional view of a washer according to an embodiment.

Referring to FIG. 1, a drum type washer includes a cabinet 1 defining an exterior of the washer and functioning as an installing/supporting base for components, a drum 7 installed in the cabinet 1 and performing washing of laundry loaded therein through a rotational motion, a tub 3 installed at an outside of the drum 7 and storing washing water, a stator 8 fixed on a rear surface of the tub 3, a rotor disposed on an outer circumference of the stator 8 and rotating by electromagnetic force generated between the stator 8 and the rotor 3, a shaft 6 functioning as a central axis of the rotor 4 and rotating together with the rotor 4.

In addition, the drum type washer further includes a bearing 5 for supporting a rotational motion of the shaft 6, and a damper 9 and spring 13 for supporting the tub 3.

The stator 8, rotor 4, and shaft 6 may be constituent elements of a motor. The stator is provided with a plurality of teeth around which coils are wound and magnets are installed on the rotor 4. The rotor rotates by the electromagnetic force generated between the coils and the magnets. Generally, the rotation of the motor means that the rotor 4 rotates by the electromagnetic force generated between the rotor and the stator.

The operation of the drum type washer will be described in time series hereinafter.

A user opens a door 11 and loads the laundry in the drum 7. Subsequently, the user sets an operational mode considering a state of the laundry and a desired operational condition through a manipulation panel 12. When the washer starts operating, the motor starts rotating and an amount of the laundry is detected in accordance with the load of the motor. Next, a washing cycle is performed in response to the amount of the laundry.

When the washing cycle starts, washing water is introduced through a washing water inlet 2 and the motor rotates to rotate the drum 7. Here, the drum 7 rotates in forward and reverse directions alternately to prevent the laundry from getting tangled and increase the washing efficiency of the drum type washer having relatively lower washing force compared with other types of washers.

During the performance of the washing cycle, a load applied to the drum steeply changes. That is, during the performance of the washing cycle, the drum repeatedly rotates forward and reverse directions and thus the load that is applied to the drum in order to change the rotational direction significantly changes. Particularly, when a relative large amount of laundry is loaded in the drum, the load change will further increase. In addition, during the momentary change (although it is not a second unit, the drum must quickly rotate and stop to effectively perform the washing cycle) of the speed of the drum, the position of the laundry that rotated and fallen in the drum changes and thus the load change further increases.

When the load and rotation state change as described above, the position of the drum 7 cannot be accurately assumed. In more detail, two hall sensors 14 are generally installed on the stator 8, and an on/off signal is attained four times for an electrical angle of 360° for the position of the rotor using the two hall sensors 14. In addition, the position of the rotor 4 (the rotor rotates together with the drum) is assumed at an interval between the on and off of the hall sensor 14. If the large number of the hall sensor 14 can be installed, the position of the rotor can be accurately assumed. However, this is impractical since a space of the stator is small and the control of the hall sensors is difficult. That is, only several hall sensors are capable of being installed.

When the load applied to the drum changes during the assumption of the position of the rotor 4 as described above, the speed of the drum 7 is suddenly reduced or increased and thus it is impossible to accurately assume the position of the drum 7.

If a current position of the drum 7 is not accurately assumed, the power applied to the coils of the stator can not be controlled accurately. Particularly, for the flux weakening operation mode using the vector control method, a d-axis and a q-axis on a d-q axis rotating coordinate system are respective defined to be in parallel with and perpendicular to a flux direction of the permanent magnets and the power is designed to be accurately applied in directions of the d-axis and the q-axis.

Therefore, since a method in which an application direction of a current vector on the d-q axis rotating coordinate system is accurately controlled is used, the above-described limitation of the power control more significantly occurs.

Considering the above limitations, in the embodiment, the motor does not perform the flux weakening operation mode in the washing cycle.

Describing the vector control method, the vector control method is a kind of the power application control method for controlling a current applied to the coils. In more detail, a d-q axis rotating coordinate system that is defined by a d-axis that is in parallel with a magnetic flux direction of the permanent magnets disposed on the rotor and a q-axis that is perpendicular to the magnetic flux direction of the permanent magnets is set to control the current such that the current can be applied in a direction in parallel with the d-axis and the q-axis. Needless to say, the current applied to the d-q axis will be applied after being converted into 3-phase power of a uvw stationary coordinate system. The vector control method has an advantage of more accurately controlling the current applied to the motor and enabling a flux weakening control of the motor, thereby increasing a motor speed to a level that is higher than a rated speed of the motor.

Briefly describing the flux weakening operation mode, the flux weakening operation mode is for solving the limitation where, when the motor of the washer reaches the rated speed, an amount of the current applicable to the motor is reduced by counter electromotive force and thus the speed of the motor cannot be increased any more even when the current is applied. That is, the flux weakening operation mode is for forcedly weakening the flux of the permanent magnets. In more detail, the flux weakening operation mode is a mode where, the flux is weakened by increasing an amount of the current applied in the d-axis that is in parallel with the magnetic flux direction of the permanent magnets in the d-q axis rotating coordinate system used in the vector control method after the motor reaches the rated speed. By this, the motor can be driven with a speed higher than the rated speed although the operating efficiency of the motor is deteriorated. If the current applied to the d-axis and q-axis is not accurately controlled due to an assumption error of the position of the rotor that may be caused by the load change, the power may be rather applied in an inaccurate direction. Therefore, the flux-weakening operation mode requires a precision control. If it becomes that the flux weakening operation mode is applicable, the motor enables the drum to rotate at a speed higher than the rated speed and thus the drum type washer can use a motor having a capacity less than a required standard.

The description of the operation of the drum type washer will be continued hereinafter.

When the washing of the laundry is finished through the above-described process, the washing water is drained through a washing water outlet 10 and the washing cycle is finished. Subsequently, the rinsing and spinning cycles are performed. Here, the rinsing cycle is similar to the washing cycle. That is, in the rinsing cycle, the drum rotates in the forward and reverse directions alternately so that the laundry is washed.

Since the rinsing cycle has also a relative large load change of the laundry disposed in the drum, the operation that is described for the washing cycle can be identically applied to the rinsing cycle.

After the rinsing cycle is finished, the spinning cycle for removing the water from the laundry is performed. In the spinning cycle, the drum must rotate at a high speed. That is, the spinning cycle simply requires the high speed rotation of the drum, the load change is not big and thus the flux weakening control can be smoothly realized. By the flux weakening control, the speed of the drum can be further increased.

Figure 2:
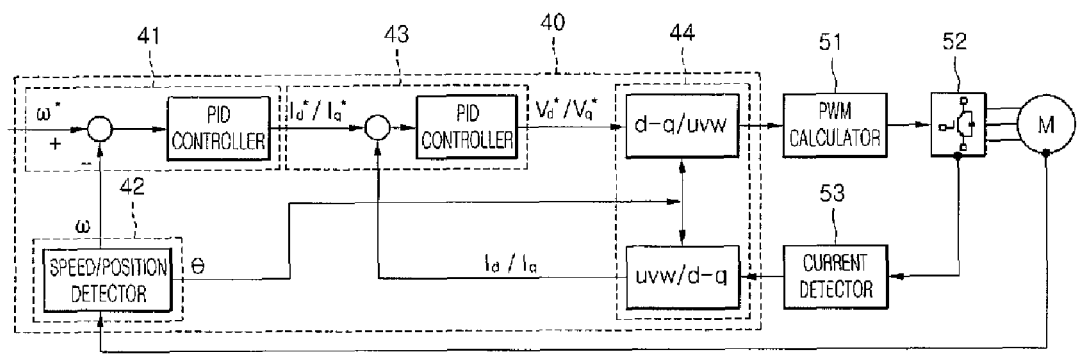
FIG. 2 is a block diagram illustrating an apparatus for controlling a motor for a washer according to an embodiment.

FIG. 2 is a block diagram illustrating an apparatus for controlling a washer motor according to an embodiment. An apparatus of this embodiment is for driving the washer motor of FIG. 1. The apparatus may be defined by a plurality of components such as control chips installed on a board mounted in the washer.

Referring to FIG. 2, there are provided a motor controller 40 controlling power input to the motor M, a PWM calculator 51 that receives a signal of a uvw stationary coordinate system from the motor controller 40 to generate a PWM signal, an inverter 52 that receives the PWM signal to directly control the power input to the motor M, and a current detector 53 for detecting an existing current Id of the d-axis and an existing current Iq of the q-axis from the inverter 52.

In more detail, the motor controller 40 includes a speed/position detector 42 for detecting a speed and position of the motor M, a speed controller 41 for generating a reference current Id* and a reference current Iq* of the q-axis by adjusting current components Id and Iq on the d-q axis rotating coordinate system defined by the q-axis that is perpendicular to the magnetic flux direction of the permanent magnets and the d-axis that is in parallel with the magnetic flux direction of the permanent magnets so that, by comparing a current speed ω of the rotor detected by the speed/position detector 42 with a reference speed ω*, the current speed ω follows the reference speed ω*, a current controller 43 for generating a reference voltage Vd* of the d-axis and a reference voltage Vq* of the q-axis by PID-controlling the existing currents Id and Iq based on the reference current Id* of the d-axis and the reference current Iq* of the q-axis that are output from the speed controller 41, and a coordinate system converter 44 for converting the d-q axis rotating coordinate and the uvw stationary coordinate into each other.

Here, the speed/position detector 42 detects the position and speed of the rotor using one or more hall sensors 14 (see FIG. 1) installed on the motor M (i.e., the stator 8 of the motor M). Two hall sensors 14 may be installed to detect a position state at every electrical angle of 90°. However, the present disclosure is not limited to this. For example, three hall sensors may be installed to more accurately detect the position of the rotor.

The following will describe a method of controlling the motor for the washer with reference to the apparatus of FIG. 1.

In a start mode where the stopped motor starts rotating, the rotor is forcedly aligned with a predetermined position. At this point, a pulse is applied for a predetermined time to the d-axis that is in parallel with the permanent magnets in the d-q axis rotating coordinate system so that the motor can be aligned with a position (that may be preset in accordance with a relative relationship between the permanent magnets and the coils) corresponding to the permanent magnets.

After the above, a current is applied to the motor so that the motor starts rotating at the preset position (which may be a motor control information and stored as a forced aligned position). Meanwhile, after the rotor rotates by an electrical angle of 90° at the forced aligned position, the passing of the permanent magnet is detected by one of the hall sensors 14. Subsequently, when the rotor further rotates by the electrical angle of 90°, the passing of the permanent magnet is detected by another one of the hall sensors 14. As described above, it can be understood that the hall sensors are located such that a predetermined detecting signal is generated at every 90° rotation of the rotor.

Meanwhile, according to a feature of this embodiment, the speed/position detector 42 continuously assumes the position and speed of the rotor 4 using the detecting signal of the hall sensors 14 in the start mode. That is, when two hall sensors 14 are provided, the speed/position detector 42 performs a function generating a predetermined signal at every 90° rotation of the rotor. In this case, the speed and position of the rotor are assumed by the speed/position detector 24 at a region between positions at the electrical angles of 90°. In this case, the speed and position of the rotor can be continuously assumed without any discontinuity points.

According to this embodiment, since the vector control method is applied even in the start mode, the continuous assumption of the speed and position of the rotor becomes possible. In more detail, the vector control method applies the power to the motor M using the d-q axis rotating coordinate system. At this point, if any discontinuity points are generated at the assumed position/speed of the rotor (actually the position of the rotor may more affect on the generation of the discontinuity points), the current applied to the d-axis that is in parallel with the permanent magnet and the q-axis that is perpendicular to the permanent magnet abruptly changes at a related position (i.e., a detecting position of the hall sensor). In this case, noise is generated and sometimes inverse torque is generated in the rotor to stop the rotor. Needless to say, the inverse torque may be generated when the rotor rotates at a high speed. In this case, since the inertia of the rotor is relatively large, the inverse torque does not substantially affect on the rotation of the rotor.

A concept of the counter electromotive force will be described using the imaginary d-q axis rotating coordinate system of FIG. 3.

Figure 3:
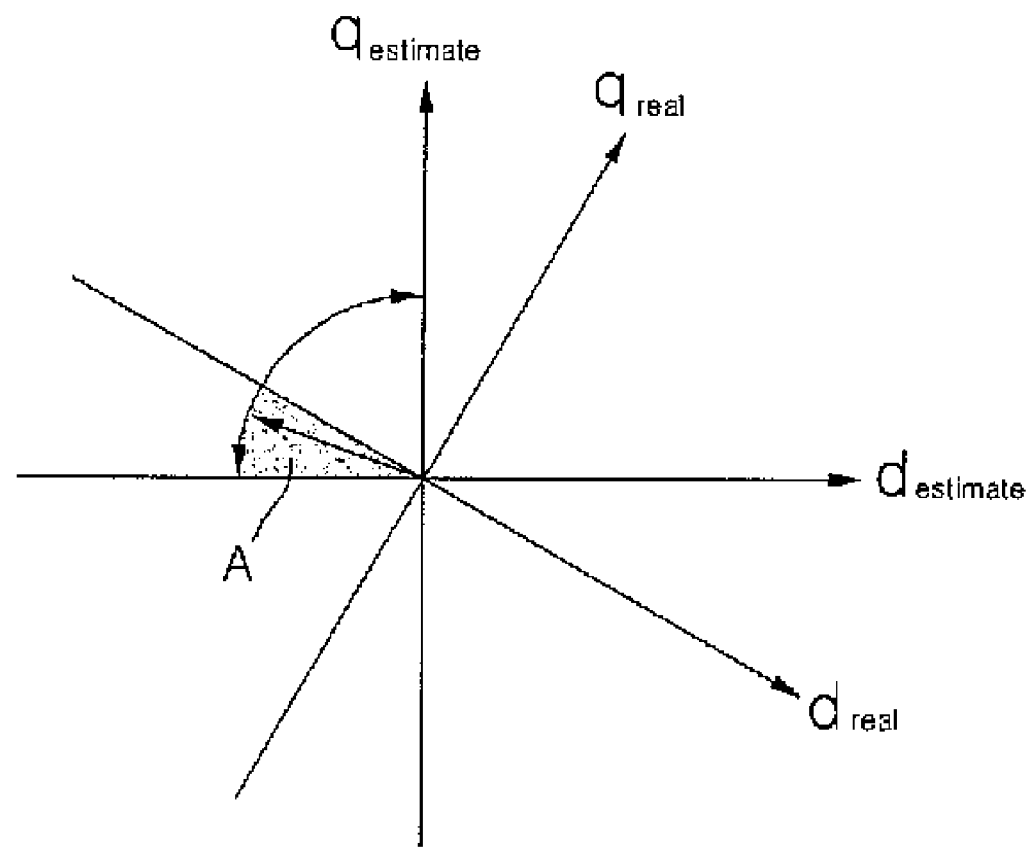
FIG. 3 is a view of a d-q axis rotating coordinate system illustrating a concept of an inverse torque.

Referring to FIG. 3, horizontal and vertical axes respectively define the parallel and perpendicular directions to the flux direction at the positions of the permanent magnet, which are assumed by the speed/position detector 42. The horizontal axis is a current direction d_estimate of the d-axis of the d-q axis rotating coordinate system and the vertical axis is a current q_estimate of the q-axis of the d-q axis coordinate system. Unlike the position assumed as described above, actual positions of the permanent magnets may be represented as a current direction d_real of the d-axis of the d-q axis rotating coordinate system and a current q_real of the q-axis of the d-q axis coordinate system. The values assumed by the speed/position detector 42 may be different from the actual positions of the rotor. This may be typically caused by the momentary speed change of the rotor due to the large load charge or the large speed change in the start mode of the motor.

In this case, when the current is applied to a region A in a range of a second quadrant where the flux weakening control is possible, it is regarded that the current is applied such that the motor rotates in the reverse direction although the current is applied in a direction for performing the flux weakening control based on the assumed position of the rotor. In this case, it is regarded that the current applied to the motor is applied in the direction for rotating the motor in the reverse direction, i.e., a direction for generating the inverse torque. In more detail, when the current is applied to the region A, it is regarded that the current is applied in a direction +q_estimate for performing the flux weakening control and accelerating the motor based on the assumed positions of the permanent magnets. However, based on the actual positions of the permanent magnets, it is regarded that the current is applied in a direction −q_real for reducing the speed of the motor. As a result, when the assumed position of the rotor is in advance of the actual position of the rotor, a region where the inverse torque is generation is formed. At this point, the control is unstably performed and thus noise, vibration, and breaking off phenomenon occur. Needless to say, as previously described, this may occur in the washing and rinsing cycles where a relative large load change occurs during the operation of the washer. In the washing cycle, since the laundry rotates together with the drum, the assuming position is almost same as the actual position and thus there is almost no inverse torque. The inverse torque may occur in the start mode where the speed change is relative high.

In consideration of these limitations, in this embodiment, the flux weakening control is not performed in a low speed cycle such as the washing and rinsing cycles but performed only in the spinning cycle. By doing this, even when the actual position of the rotor is different from the assumed position, the inverse toque occurring problem can be solved since the current is not applied in the d-axis direction but in the q-axis direction with reference to FIG. 2.

Further, the speed ω and position θ of the rotor are continuously assumed in the start mode of the washer motor and these continuously assumed values are used for controlling the washer motor. Here, the "continuous" means that there is only one value at one time zone. Preferably, the continuous assumed values may have a continuous curve of a sine function.

Referring again to FIG. 2, the existing speed ω of the rotor detected by the continuous assumption by the speed/position detector 42 is input to the speed controller 41 and is PID-controlled together with the reference speed ω*. Further, the speed controller 41 outputs the d-axis reference current Id* and q-axis reference current Iq* of the d-q rotating coordinate system.

If the flux weakening operation mode is being performed, this means that the d-axis reference current id* is not in a 0 state and thus the current is applied in the d-axis direction for weakening the flux of the permanent magnet.

The output reference currents Id* and Iq* are input to the current controller 43 and compared with the existing currents Id and Iq of the inverter 52 defined by the d-q rotating coordinate system which are detected by the current detector 53 and converted by the coordinate system converter 44, thereby performing the PID control. The current controller 43 outputs the reference voltages Vd* and Vq* on the d-q rotating coordinate system.

The reference voltages output from the current controller 43 are converted into the reference voltages on the uvw stationary coordinate system by the coordinate system converter 44 and are input to the PWM calculator 51. The PWN calculator 51 generates the PWM signal corresponding to the reference voltage and inputs the PWM signal to the inverter 52. Six transistors provided by the inverter 52 turn on/off the power to drive the motor.

Figure 4:
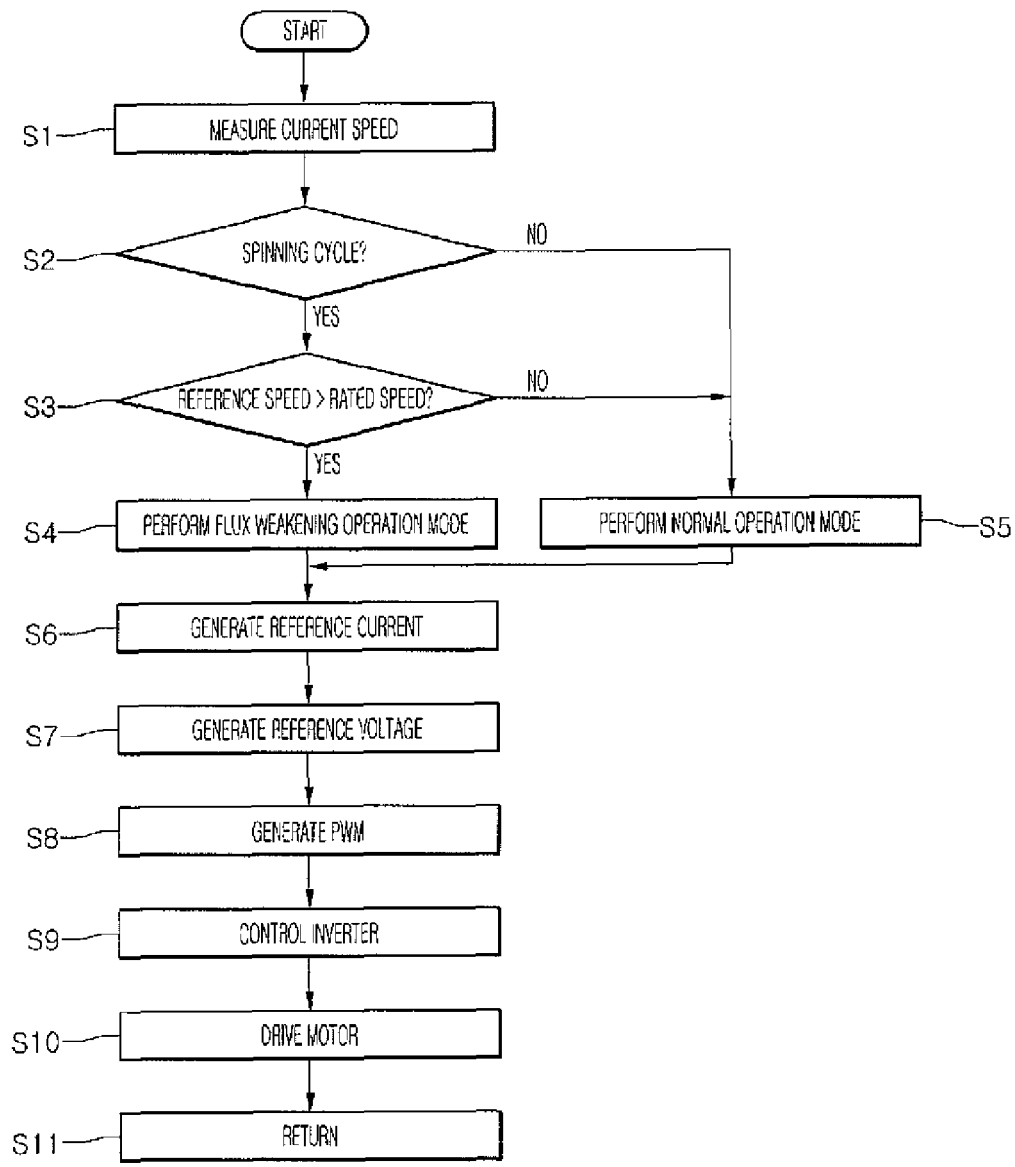
FIG. 4 is a flowchart illustrating a method for controlling a washer according to an embodiment.

FIG. 4 is a flowchart illustrating a method for controlling a washer according to an embodiment.

Referring to FIG. 4, a current speed is measured in a washing cycle (S1). A current cycle of the washer is determined (S2). When it is determined that the current cycle is not a spinning cycle, the washer performs a normal operation mode (S5). When it is determined that the current cycle is the spinning cycle, a reference speed is compared with a rated speed (S3). When the reference speed is greater than the rated speed, a flux weakening operation mode is performed (S4). When the reference speed is less than the rated speed, the normal operation mode is performed (S5). That is, the washer operation is altered in accordance with the current cycle of the washer.

Here, the rated speed means that, when the motor reaches this rated speed, the speed of the motor cannot increase any more even when the current is applied to the motor. The rated speed may be varied in accordance with a specification of the motor or a specification of the washer. The rated speed may be set as 600 rpm.

When one of the flux weakening operation mode and the normal operation mode is determined through the above-described process, in the operations S4 and S5, the speed controller 41 generates proper reference currents Id* and Iq* by comparing the measured current speed with the reference speed (S6). Here, if the flux weakening operation mode is performed, it can be easily understood that the reference current Id* has a value that is not 0.

The reference current Id* and Iq* are input to the current controller 43, detected by the current detector 53, compared with existing currents Id and Iq of the inverter, which are defined on the d-q rotating coordinator, PID-controlled, and output reference voltages Vd* and Vq* on the d-q rotating coordinate system (S7).

The reference voltages Vd* and Vq* output from the current controller 43 are converted into the reference voltages on the uvw stationary coordinate system by the coordinate system converter 44 and are input to the PWM calculator 51. The PWN calculator 51 generates the PWM signal corresponding to the reference voltage and inputs the PWM signal to the inverter 52 (S8). Six transistors provided by the inverter 52 turn on/off the power to drive the motor M (S9 and S10).

After the above, the process is returned to continuously perform the above-described processes (S11).

As described above, since the flux weakening operation mode is selectively performed in accordance with the operation cycle of the washer, the noise and vibration generated in the washer can be reduced. Furthermore, the system can stably operate. Further, in the washing and rinsing cycles, even when the speed of the motor is inaccurately detected due to an inaccurate detection of the speed and position, the flux weakening operation mode is not performed and thus the operational reliability of the washer can be further enhanced.

The following will describe how the vector control method can more stably operate the washer motor in the start mode of the motor.

Figure 5:
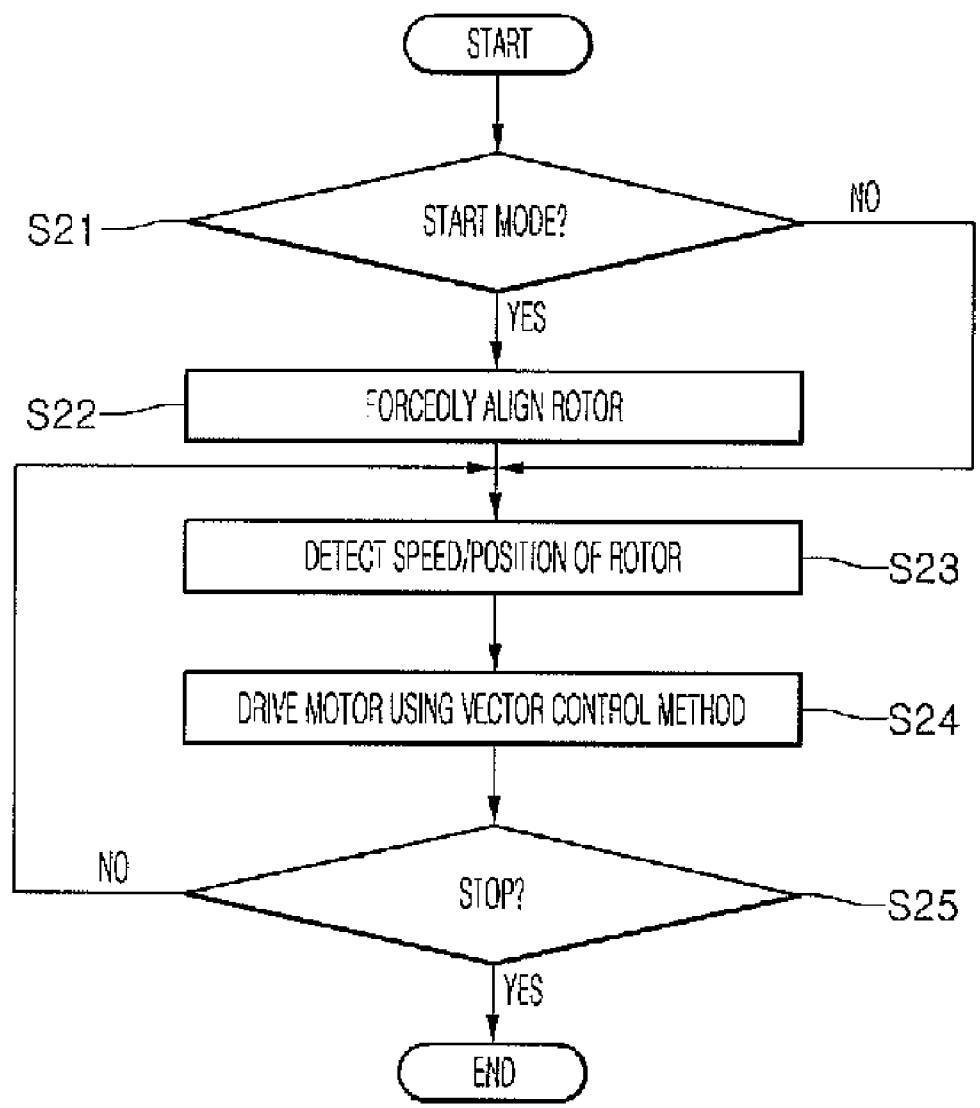
FIG. 5 is a flowchart illustrating a method for controlling a motor for a washer according to an embodiment.

FIG. 5 is a flowchart illustrating a method for controlling a motor for a washer according to an embodiment of the present invention. The above-described method for controlling the motor for the washer will be described with reference to FIG. 5.

Referring to FIG. 5, it is first determined if it is a start mode where the motor starts rotating (S21). When it is determined that it is the start mode, the rotor is forcedly aligned (S22). When it is determined that it is not the start mode, the speed/position of the rotor is detected (S23).

In the forcedly aligning operation S22, the rotor can be aligned with a specific position related to the permanent magnets by applying a plurality of pulses (e.g., five pulses) having a 5-second application interval in a direction in parallel with the d-axis on the d-q coordinate system. Even after the rotor is aligned, the speed/position detecting operation S23 is performed.

In the speed/position detecting operation S23, the current position and speed of the rotor are assumed in accordance with the signals of the hall sensor 14, which are generated at every electrical angle of 90°.

For example, in a method for assuming the position of the rotor, a plurality of tables storing a plurality of sine functions are set in the start mode considering an amount of laundry, a specification of the washer, and a selected operation mode and the selected sine function among the tables is converted in accordance with the detecting signal of the hall sensors. After the motor rotates by a predetermined electrical angle, the position can be continuously assumed in accordance with information on an initial speed. However, in this case, at a time point where the detecting signal of the hall sensor is generated, the position and speed of the rotor are a single value whose front and rear are continuous.

Alternatively, the position of the rotor can be continuously assumed while converting at least one coefficient (that may be altered by an on/off signal of the hall sensor) acting as a factor of the sine function having a factor that is time.

The following will describe a continuous position assumption process of the rotor with reference to a signal diagram.

Figure 6:
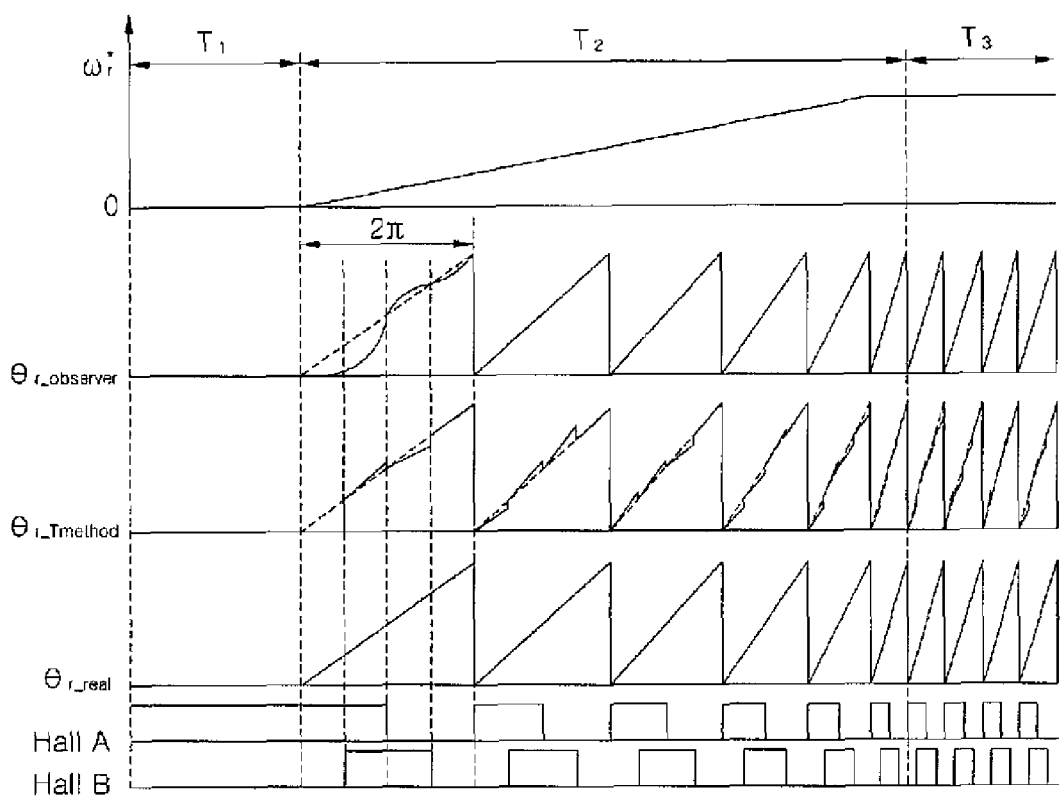
FIG. 6 is a graph illustrating a position assuming process of a rotor.

FIG. 6 is a graph illustrating a position assumption process of the rotor.

Referring to FIG. 6, an on/off signal of at least one of the hall sensors Hall A and Hall B is altered at every electrical angle of 90° as time passes. As the on/off signal of the hall sensor is altered, a real position θr-real of the rotor rotates while linearly increasing along an angle of 360°.

The following will describe a method for assuming the real position θr-real of the rotor using the alternation of the on/off signal of the hall sensor 14.

In a method (T-method) for newly setting an assumption position of the rotor as a real position of the rotor at each point where the on/off signal of the hall sensor is altered, it can be noted that three discontinuity points are generated within a 360° range that is a one cycle of an electrical angle for an assumption position θr-Tmethod of the rotor. This method is used in the related art where discontinuity points are generated in each cycle and thus the motor cannot be driven in the start mode by the application of the vector control method or, even when driven, vibration/noise is generated.

In order to improve the above limitations, in this embodiment, the speed/position detector 42 operates to provide a continuous assumption value during the 360° cycle while using an on/off signal of the hall sensor as a factor. The method for continuously assuming the speed/position by the speed/position detector 42 is already described above. In this case, as shown in the drawing, the assumption position θr-observer is provided in the form of a continuous sine function not having the discontinuity point. Further, the speed/position is repeated assumed at every cycle of 360°.

Meanwhile, the reference speed ωr* shows that the rotor does not rotate during the forcedly aligning time T1 but aligned relative to the stator. In the start mode of the motor T2, the speed of the rotor slowly increases. In the normal mode T3 of the motor, the motor rotates at the normal speed. In this embodiment, it can be noted that the position of the rotor is continuously assumed in the start mode T2 so as to apply the vector control method even in the start mode T2 of the motor.

Explanation will be given with reference again to FIG. 5.

In the speed/position detecting operation S23, after the speed/position of the rotor is detected by the method for assuming the speed/position of the rotor, the rotor rotates in accordance with the vector control method using the detected information (S24).

After the above, it is determined if a signal for stopping the rotor is generated (S25). When it is determined that the signal for stopping the rotor is generated, the rotor stops rotating. When it is determined that the signal for stopping the rotor is not generated, the process is returned to the speed/position detecting operation S23.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

For example, although it is described in the above that the speed/position detector assumes and detects the speed and position of the rotor using the on/off signal detected by the hall sensors installed on the motor, the present disclosure is not limited to this. That is, the speed and position of the rotor may be attained by using an output voltage of the inverter. This also falls within the sprit of the disclosure.

Further, although it is described in the above-described embodiments that, in the speed/position detecting operation of the rotor, the method for assuming the speed/position is identically applied to the start mode and normal mode of the motor and thus the speed/position is assumed by the hall sensors in the identical method. However, the present disclosure is not limited to this. Although it is required that the position and speed of the rotor are assumed with a continuous value in the start mode of the motor, even when the related art method where the rotor is newly set to the current position of the rotor at the position where the on/off signal of the hall sensor is generated is applied, the same result can be attained. This is because that there is no difficulty in smoothly rotating the rotor by the rotational inertia of the rotor even when there is a discontinuity point in the normal mode of the motor.

According to the embodiments, the flux weakening operation mode is stably performed for the washer motor and one of the flux weakening operation mode and the normal operation mode can be optimally selected. Therefore, the noise and vibration of the washer can be reduced and the energy consumption efficiency can be improved. In addition, since the vector control method is used even in the start mode of the motor, the power applied to the motor can be more properly controlled and thus the noise/vibration can be further reduced and the generation of the overcurrent can be prevented.

What is claimed is:

1. A washer motor comprising:
   a stator on which a plurality of coils are wound and disposed in a circular shape;
   a rotor having a plurality of permanent magnets spaced apart from the coils by a predetermined distance; and
   a speed controller for generating at least one of a d-axis reference current Id* and a q-axis reference current Iq* by controlling currents Id and Iq on a d-q axis rotation coordinate system defined by a d-axis that is in parallel with a flux direction of the permanent magnets and a q-axis that is perpendicular to the flux direction by comparing a current speed of the rotor with a reference speed so that the current speed follows the reference speed,
   wherein, when the current speed is less than the reference speed in a spinning cycle, the speed controller generates the d-axis reference current Id*;
   a current controller for generating a d-axis reference voltage Vd* and a q-axis reference voltage Vq* based on the d-axis reference current Id* and q-axis reference current Iq* output from the speed controller; and
   an inverter for generating a PWM signal based on the reference voltages Vd* and Vq* output from the current controller and applying the generated PWM signal to the coils,
   wherein the d-axis reference current Id* generated in the washing cycle is zero (0) regardless of a difference between an actual speed and the reference speed.

2. The washer motor according to claim 1, wherein the d-axis and q-axis reference currents Id* and Iq* are controlled even in a start mode of the motor by the speed controller.

3. The washer motor according to claim 1, wherein the d-axis reference current Id* generated in the spinning cycle is zero (0) until the rotor reaches a predetermined speed.

4. The washer motor according to claim 3, wherein the predetermined speed is 600 rpm.

5. The washer motor according to claim 1, wherein the d-axis and q-axis reference currents Id* and Iq* are controlled even in a start mode of the motor by the speed controller.

6. The washer motor according to claim 1, further comprising two hall sensors installed on the stator to detect a speed/position of the rotor.

7. The washer motor according to claim 6, wherein the position of the rotor is continuously assumed by an on/off signal of the two hall sensors.

8. The washer motor according to claim 6, wherein the position of the rotor is assumed with a sine curve by the speed/position detector.

9. A method for controlling a washer motor comprising a stator fixed on a tub and a rotor rotating relative to the stator and having permanent magnets, the method comprising:
   measuring an actual speed of the rotor;
   generating d-axis and q-axis reference currents Id* and Iq* so that the actual speed of the rotor follows a reference speed by controlling currents Id and Iq on a d-q axis coordinate system defined by a d-axis that is in parallel with a flux direction of the permanent magnets and a q-axis that is perpendicular to the flux direction; and
   generating a PWM signal based on the reference currents to rotate the motor,
   wherein, when the washer motor is in a washing cycle, the d-axis reference current Id* is zero (0) regardless of a difference between an actual speed and the reference speed, thereby reducing generation of an inverse torque.

10. The method according to claim 9, wherein in an operation of generating the reference currents, the d-axis reference current Id* is generated when the washer motor is in a spinning cycle so that the actual speed follows the reference speed over a rated speed.

11. The method according to claim 9, wherein at least one hall sensor is installed on the stator and the position of the rotor is continuously assumed in accordance with an on/off signal of the hall sensor.

12. The method according to claim 10, wherein the d-axis and q-axis reference currents Id* and Iq* are controlled even in a start mode of the motor by the speed controller.

13. The method according to claim 11, wherein in an operation of generating the reference currents, the d-axis reference current Id* is generated when the washer motor is in a spinning cycle so that the actual speed follows the reference speed over a rated speed.

14. A method for controlling a washer by driving a motor comprising a stator fixed on a tub and a rotor rotating relative to the stator and having permanent magnets, the method comprising:
   stopping a flux weakening operation mode in a washing cycle so that the motor can be stably driven even when there is an abrupt load change; and
   performing the flux weakening operation mode in a spinning cycle so that the motor rotates at a high speed,
   wherein, in the washing cycle, the d-axis reference current Id* is zero (0) regardless of a difference between an actual speed and the reference speed, thereby reducing generation of an inverse torque.

* * * * *